United States Patent [19]

Efstratis et al.

[11] Patent Number: 5,546,708
[45] Date of Patent: Aug. 20, 1996

[54] SELF-LEVELING COUNTERTOP UNDERLAYMENT

[76] Inventors: Eleftherios T. Efstratis, 143 Hopfield Dr., Folsom, Calif. 95630; Dale E. Watnee, 5302 Hibiscus Dr., Fair Oaks, Calif. 95628

[21] Appl. No.: 106,599

[22] Filed: Sep. 23, 1993

Related U.S. Application Data

[62] Division of Ser. No. 763,283, Sep. 20, 1991, Pat. No. 5,260,007.

[51] Int. Cl.⁶ ..................................................... E04H 1/00
[52] U.S. Cl. ............................ 52/36.2; 52/388; 52/34; 312/140.3
[58] Field of Search .................... 52/344, 34, 35, 52/36.1, 36.2, 302.6, 384, 388, 389, 390, 385; 312/140.1, 140.3, 140.4, 204, 265.5, 265.6; 204/35

[56] References Cited

U.S. PATENT DOCUMENTS

| | | |
|---|---|---|
| 1,887,113 | 11/1932 | Bartels ........................................ 52/385 |
| 2,229,742 | 1/1941 | Kauffman ..................................... 52/390 |
| 3,740,911 | 6/1973 | O'Leary ....................................... 52/388 |
| 4,415,616 | 11/1983 | Angioletti .................................... 52/385 |
| 4,522,855 | 6/1985 | Bethea ........................................ 52/389 |
| 4,642,960 | 2/1987 | Wallover, III .............................. 52/389 |
| 4,920,716 | 1/1990 | Coffey ........................................ 52/386 |
| 5,060,438 | 10/1991 | O'Rourke ................................... 52/371 |

Primary Examiner—Kien T. Nguyen
Attorney, Agent, or Firm—Joseph E. Gerber

[57] ABSTRACT

A self-leveling underlayment for a tile countertop is disclosed. Roofing felt covers the deck, and a flashing strip is fitted along the seam where the deck meets walls. Metal lath is laid over the felt, and rebar is laid along edges of the deck. Backsplash tile is supported by lengths of backer board along walls adjacent the deck. A self-leveling, water-based, cementitious underlayment mix, once set-up, supports the tile.

7 Claims, 6 Drawing Sheets

SELF-LEVELING COUNTERTOP UNDERLAYMENT

CROSS REFERENCES TO RELATED APPLICATION

This is a division of application Ser. No. 07/763,283, filed Sep. 20, 1991.

BACKGROUND OF THE INVENTION

1. Field of the Invention

The present invention relates generally to underlayments for tile countertops, and more specifically to a self-leveling countertop underlayment, as well as a kit for constructing same.

2. Description of the Related Art

Proper installation of countertop tile first requires that a stable, level underlayment be prepared upon the deck to be tiled. Cabinet decking, over which countertops are usually laid, is normally constructed of plywood, ¾" exterior grade being the most common type of plywood used. This plywood acts as the substrate for the underlayment to follow.

In the past, underlayments have been constructed in several ways. The most traditional type first requires construction of a metal screed box around the area to be tiled. Metal cap strip is usually used for constructing the screed box. The cap strip has adjustment slots at its points of attachment to the cabinet to permit the screed box to be leveled. Then, a moisture-resistant paper such as roofing felt is laid over the deck's surface. Next, a powdered concrete underlayment compound comprised of sand, cement and lime is mixed with water and packed into the screed box. The underlayment is leveled by repeatedly passing a screed board over its surface and filling low spots with additional mix until the desired surface is achieved.

One of the problems with this method is that the screeding-off process is very time-consuming; extraordinary attention is required to yield a true surface. And, unless an inordinate amount of time is spent in perfecting such an underlayment, any such screeded surface will have some imperfections. Tile setters having skills sufficient to lay tile evenly over such imperfections earn much higher wages than tile setters of only average skill.

More modernly, underlayment is constructed by covering the cabinet's deck with cementitious panels such as are known in the trade and sold as "Wonderboard" and "Durarock." These panels are nailed to the deck. Seams between these panels are covered with tape and then smoothed over with a spreadable underlayment compound, such compound commonly being latex-based. Counter-sunk nail holes in the panels are also filled with this compound. Then, tile is laid thereover.

Cementitious panels make a somewhat more flexible underlayment than concrete and, therefore, are more resistant to cracking. However, with these panels it is very difficult to achieve a truly level surface. Slopes, twists and other imperfections in the substrate are often uncorrectable and tend to be carried through to the overlying tile. Again, higher-skilled, more expensive tile setters must be employed if a quality tile surface is desired.

Thus, it appears that a need exists for a true-surfaced underlayment product that is able to be precisely leveled by lower-paid workers.

SUMMARY OF THE INVENTION

The product of the present invention is adapted to overcome the above-identified shortcomings and to fulfill the stated needs.

The claimed tile countertop underlayment product comprises a sheet of lath affixed to said deck; and, a hardened, self-leveling, settable fluid matrix covering the lath and having an upper surface sufficiently level and even for tiling.

The inventive product is produced by a method adapted to being practiced on a generally horizontal deck and comprising the steps of covering the deck with a sheet of lath and affixing the lath to the deck; defining a mold for the underlayment by affixing an upstanding dam to all of the deck's edges such that the dam projects above the deck's surface to a height able to contain a sufficient underlayment; pouring a self-leveling, settable, fluid matrix into this mold; and, permitting the matrix to set hard and thereby form an underlayment with an upper surface sufficiently level and even for tiling.

An alternative product is adapted for use on a deck having one or more outer edges adjacent to a wall. The method by which this alternative product is formed includes the step of fitting fluid-impervious strips along all interfaces where said deck's outer edges meet adjacent walls before pouring the matrix into the mold.

The kit for constructing a tile countertop underlayment comprises: a sheet of lath able to be affixed to a deck; a dam able to be affixed in an upstanding orientation to an outer edge of the deck not adjacent to a wall; and, means for preparing a self-leveling, settable fluid matrix for covering the lath and for forming a surface sufficiently level and even for tiling.

And, as the combinations of elements at several key steps in carrying out the construction of the product herein are also inventive, the combination or "setup" of those elements at each such key step is claimed as well.

The inventive countertop underlayment product herein yields efficiency and economy heretofore unachieved in the art. For example, the quality of this underlayment's upper surface is such that, instead of using the highest-paid tile setters in the trade (those able to correct and tile-over uneven underlayment surfaces) minimally-skilled tile setters can be employed at an approximate 60% saving in wages. Further, although the materials used in constructing this product cost some 20% more than those for other underlayments, construction time is cut in half when compared with construction time needed for conventional underlayments, thus resulting in very significant savings in labor costs. Construction of this product is also considerably cleaner than construction of an underlayment by the traditional screed box method which causes concrete to be scraped off onto the floor in the leveling process.

Thus, objects of the present invention are to provide a tile countertop underlayment product which is cleaner, more efficient and more economical to construct.

Yet another object of this invention is to provide a kit specially-adapted to carrying out the efficient, economical method described herein.

A further object of the present invention is to provide a tile countertop underlayment having a precisely level surface possessing substantial rigidity.

Still further objects of the inventive method, kit and underlayment disclosed and claimed herein will be apparent from the drawings and following detailed description thereof.

DESCRIPTION OF THE PREFERRED EMBODIMENT

Referring now specifically to the drawings, the inventive an underlayment for a tile countertop will be disclosed, as will the product of the preferred method forming the underlayment and a kit for carrying out same.

Figure 1:
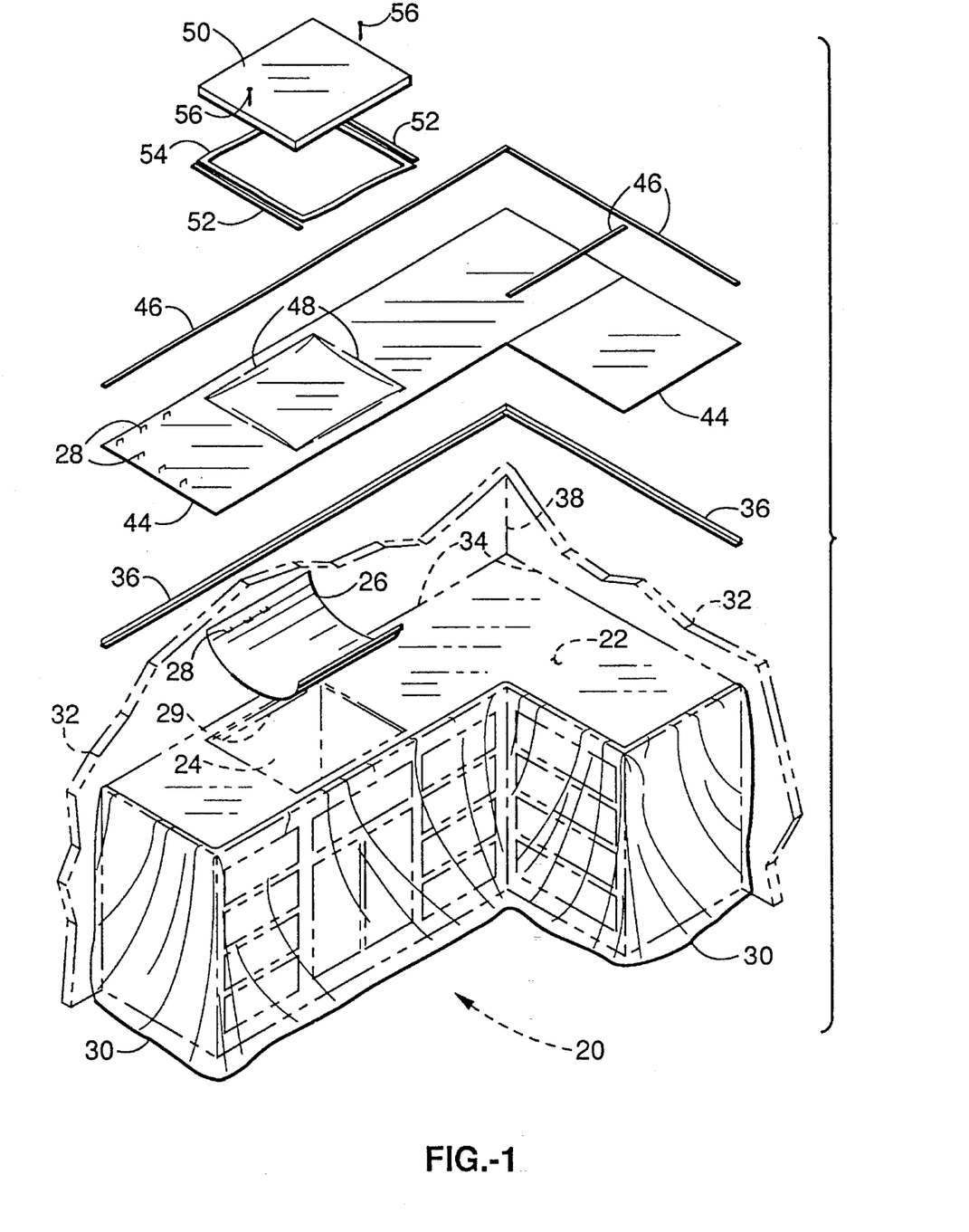
FIG. 1 is an exploded perspective view showing a cabinet with a shroud over its front face, and showing a paper sling, flashing strips, roofing felt, staples, tape, grout and a sink punch-out above the cabinet in their order of application to the cabinet's deck.

The method is practiced upon any generally horizontal surface where a tile countertop is to be laid, as upon a set of kitchen cabinets 20, for example, as shown in FIG. 1, et seq. Cabinets 20 have a top deck 22 which, in common construction, may be ¾" exterior grade plywood.

If any structures are closely adjacent to, and at the same approximate level of, deck 22 such as window tracks in window openings (not shown), these should be carefully covered with masking tape.

The insides of cabinets 20 must be protected during the practice of this method, so any opening such as sink opening 24, in deck 22's interior should have a barrier such as moisture-impervious, thick paper sling 26 fastened, as with ³⁄₁₆" staples 28, to the opening's inside nailer line 29. A paper commonly known in the building trades as "kraft" paper has been used with success for this purpose. Kraft paper cut to an approximate width of 3 ft. is provided in the kit herein, this being a size found to accommodate openings cut for many sinks. Kraft paper is produced by many different manufacturers and is readily available from building materials suppliers.

The front faces of cabinets 20 must also be protected, so the kit herein includes rolls of thin polyethylene plastic adapted for draping thereacross as a shroud. A transparent plastic shroud 30 of 0.3 mil thickness and a width of 36", or so, has been used with success in practicing the invention. Plastic shroud 30 is fastened along the horizontal surface of deck 22 approximately 1" from its front edge. Staples 28, spaced a few inches apart, work well for this purpose. Shroud 30 is draped from deck 22 down to the floor.

Leaks must be prevented along seams 34 where deck 22 meets any wall 32. Thus, flashing strips 36 are provided. Strips 36 having a width of 3 to 4 and constructed of thick, moisture-impervious paper are preferred for this purpose. A paper commonly known in the building trades as "window flashing" has been used with success for this purpose. Window flashing paper is produced by several different manufacturers and is readily available from building materials suppliers.

In preparing a strip 36 for placement, it is first cut to the length of the seam 34 to be covered. For best results in leak prevention, it is important that the entire seam 34, including all interior corners, be covered with a single length of strip 36. Before being fixed into place, strip 36 is folded lengthwise, along its approximate center, to facilitate its being seated snugly in the 90° angle between horizontal deck 22 and vertical wall 32.

Figure 2:
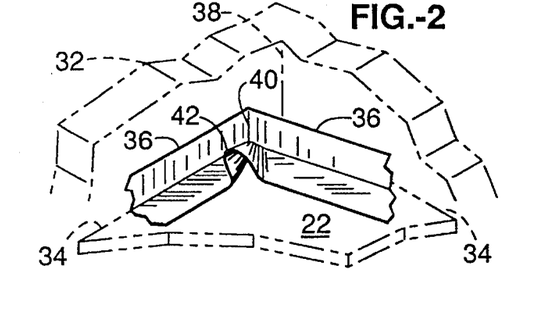
FIG. 2 is an enlarged, fragmentary perspective view showing a partially folded flashing strip being nested into a corner.
Figure 3:
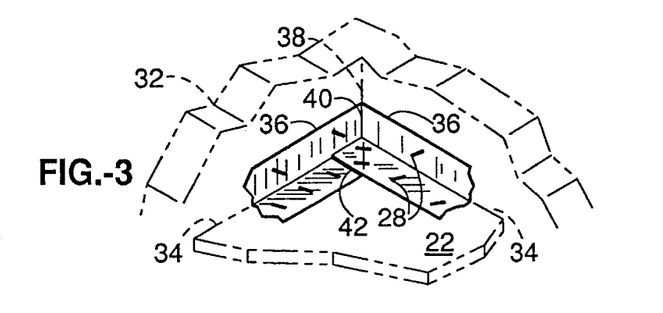
FIG. 3 is an enlarged, fragmentary perspective view showing a flashing strip properly folded and stapled into a corner.

To accommodate an interior corner 38, a transverse crease 40 is made at the point along strip 36 where adjoining panels of wall 32 meet. A fold 42 is then drawn upward at crease 40 from that half of strip 36 which lies flat on deck 22, as shown in FIG. 2. Fold 42 is laid over to one side, pressed flat and stapled to deck 22, as in FIG. 3. Staples 28, spaced a few inches apart, are then used to affix strip 36 to both deck 22 and to wall 32 along the whole of strip 36's length.

With strips 36 and the upper extreme of shroud 30 protecting the edges of deck 22's surface, a layer of fibrous, fluid-impervious sheathing material is laid down to cover the broad, exposed surface between these. For this purpose, 15 lb. roofing felt 44 is preferred. Felt 44 prevents moisture damage to deck 22 and cabinets 20 from the underlayment to follow. Felt 44 also acts as a "fracture membrane," thereby reducing the likelihood of cracks in the final tile surface caused by flexing of seams and other imperfections in deck 22. The kit herein includes felt 44 cut to an approximate 24" width to match the standard horizontal depth of most countertops. The entire surface of deck 22 should be covered as shown in FIG. 1, overlapping one layer with another where necessary. Masking tape 46 is used to seal all seams between felt 44 and strips 36, between felt 44 and the upper extreme of shroud 30, and between overlapping layers of felt 44.

At this point, it should also be noted that one may achieve passable results by eliminating the use of flashing strips 36 and, instead, simply using masking tape 46 to seal seam 34 between deck 22 and wall 32. If this approach is taken, greater care and the use of wider tape may be warranted in order to keep underlayment from leaking down into cabinet 20 at seam 34. And, although flashing strips 36 are included in the preferred method, kit and product, these strips may be eliminated without affecting the basic utility of the invention, and without circumventing the claims appended hereto.

As shown in FIG. 1, felt 44 is stretched over sink opening 24. Thus, sink opening 24 needs to be defined on the surface of felt 44. This is done by running the edge of a steel trowel, or any blunt instrument, around the perimeter of the opening while pressing downward. A scored line 48 defining the size and shape of the sink opening 24 results. Care must be taken not to tear or puncture felt 44.

To form a raised area to contain the underlayment at the sink opening, and thereby to define the edge of the underlayment for a sink which will be level with the tile countertop, a styrofoam sink punch-out 50 is provided. Punch-out 50 is rectangular, and dimensioned to accommodate the width and horizontal depth of a standard sink. The punch-out of the kit herein preferably has dimensions of 33"×22", although punch-outs for sinks of different sizes and shapes may alternatively be provided. Some alternatives include 18" and 19" circular punch-outs, and 18" and 19" oval punch-outs, all of these being adapted to use in forming underlayments for lavatory sinks. Bar sinks are also fairly common, punch-outs for these conveniently being 15" square. In any case, the punch-out used should be approximately 1" larger than the sink opening all the way around so that a 1" strip of deck 22, and its covering layers, remain exposed after the underlayment is poured and set. This 1" strip is needed to support the sink while permitting the sink's upper surface to be flush with the upper surface of the tile countertop.

In preparing to position punch-out 50, a pair of tape strips 52 are laid atop felt 44 along the scored line 48 to the left and right of the sink opening 24. A heavy, continuous bead of caulk 54 is then applied ½" in from all four edges on one face of punch-out 50. Punch-out 50 is then positioned between tape strips 52, and its caulked side is oriented downward. Care must be taken to leave sufficient space between the rear edge of punch-out 50 and the wall behind the sink for the reinforcement and backsplash described below. Once positioned, punch-out 50 is pressed firmly to felt 44 to form a tight caulk seal. A pair of nails 56, one centered in punch-out 50's right edge and one in its left, are convenient to hold punch-out 50 in place. Nails 1⅜" in length have been found satisfactory for this purpose.

Next, to provide for a durable framework within the underlayment, a strong, flexible sheet of lath is laid over the entire exposed upper surface of felt 44. For this purpose, a sheet of 24" wide metal lath 58, is currently preferred. Common diamond mesh lath has been used for this purpose with success, as has a 2"×2" welded wire sold under the trademark "K-Lath." However, various different types of screen, chicken wire, plastic mesh and other frameworks known to lend strength to such matrices may also function well in providing a reinforcing structure within the underlayment.

Lath 58 is tacked to deck 22 with an ample number of staples 28. Although lath 58 must be secure to deck 22, it should be left somewhat wavy to facilitate its intrusion well up into the underlayment to follow. The "K-Lath" product mentioned above is available with pre-formed undulations and, for this purpose, has been found to be a particularly expedient choice from among the many available reinforcing products.

To provide a durable edge for the underlayment, rigid, elongate, edge reinforcement members are placed closely adjacent and parallel to each of deck 22's outer edges, as well as around any interior edges defining openings in deck 22. Cold-rolled steel reinforcement bars ("rebar") ³⁄₁₆" in diameter are preferred and have been found to work well for this purpose; thus, they are included in the kit herein.

Figure 4:
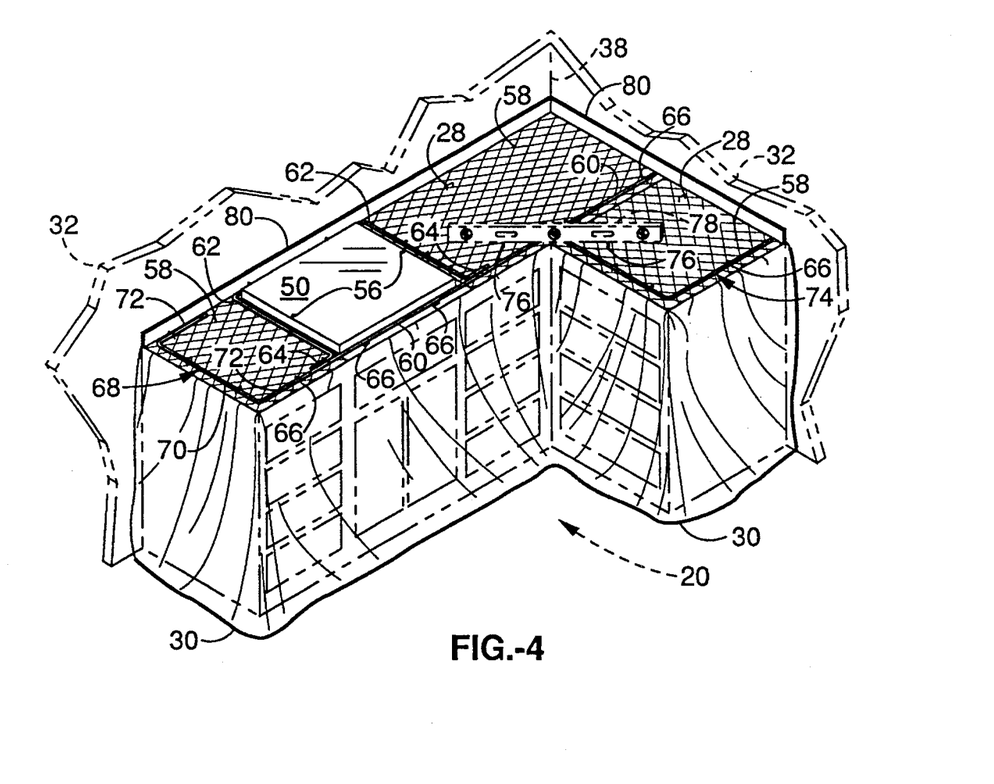
FIG. 4 is a perspective view showing the cabinet of FIG. 1 with backer board, lath and rebar laid over the elements of FIG. 1, and further showing a spirit level laid across the heads of two nails to set a uniform height for an underlayment's upper surface.
Figure 5:
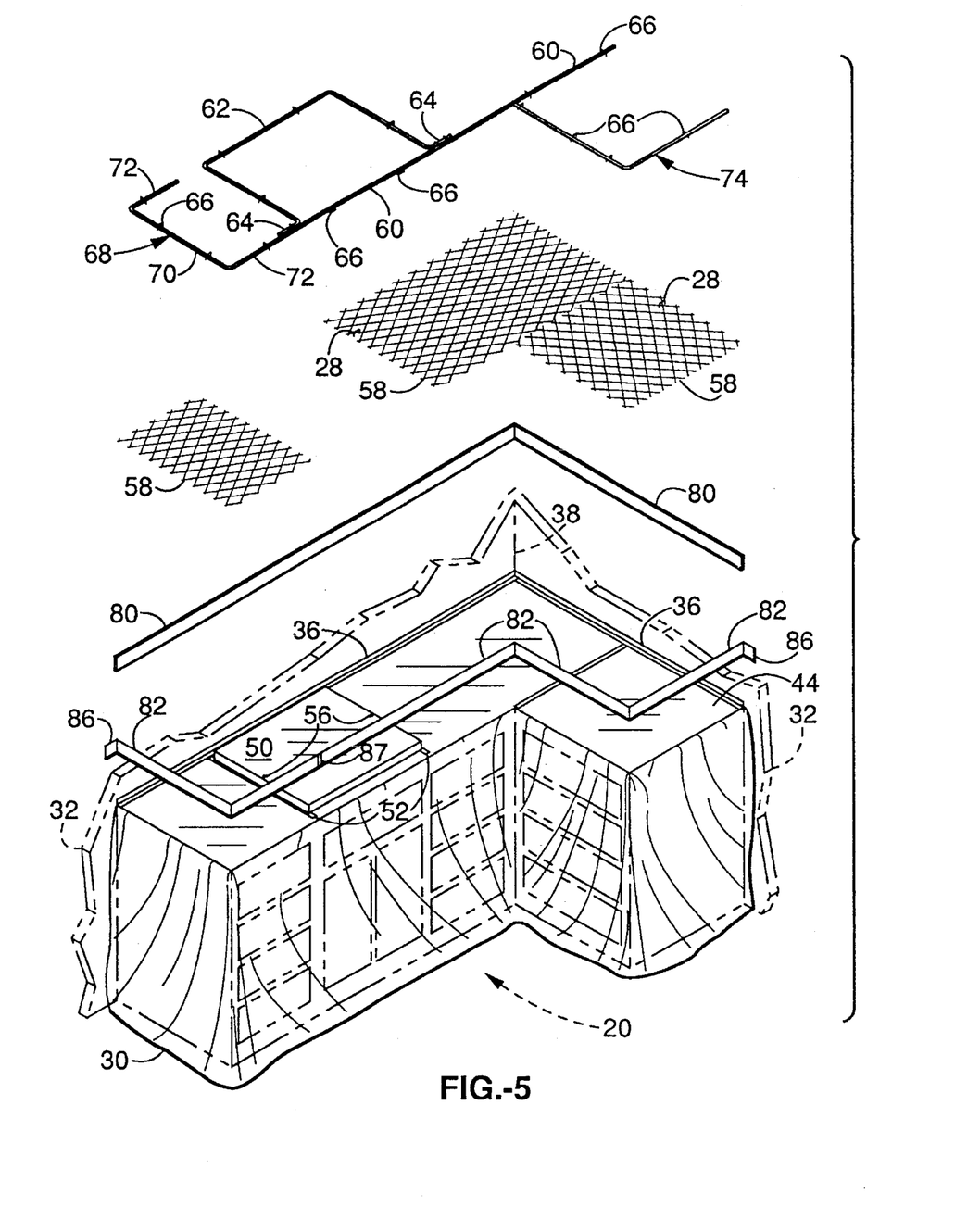
FIG. 5 is an exploded perspective view showing the cabinet and elements of FIG. 4, and further showing a dam for placement along the front edge of the cabinet.
Figure 7:
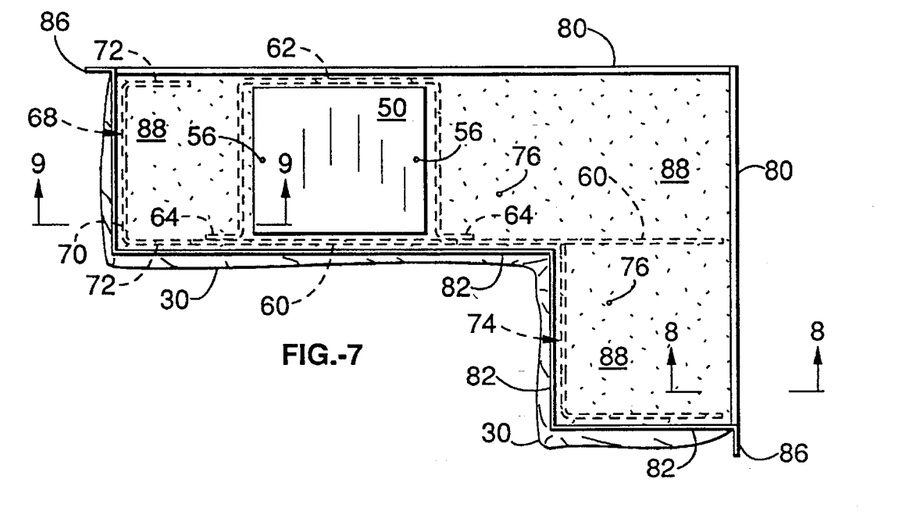
FIG. 7 is a top plan view showing the finished underlayment in place atop the cabinet.

Straight pieces of rebar 60 approximately 48" in length are provided for use along straight outer edges, as well as in other areas where straight runs are needed. These can be cut to shorter lengths, as necessary; and, longer lengths may be provided as well. And, to accommodate several standard countertop shapes and dimensions, several pre-formed pieces of rebar are provided, as best shown in FIGS. 4, 5 and 7. For example, sink opening rebar 62 has a rectangular U-shape and is dimensioned to follow the two side edges and the rear edge of sink opening 24. That is, its central leg approximates a sink's width and its side legs approximate a sink's horizontal depth in deck 22. Near the front of the sink opening, flanges 64 of rebar 62 extend outward at right angles to either side, and parallel to deck 22's front.

Flanges 64 lie closely adjacent to other rebar running along deck 22's edge, such as straight rebar 60, thereby permitting the two to be tied together, as with large staples 66. "Romex" brand staples of ¾" height and ½" width have been used for this purpose with success.

In this example, deck 22 is of the standard horizontal depth of most cabinets, that being 24". Pre-formed end rebar 68 is provided for use at the cabinet's ends as shown in FIGS. 4, 5 and 7. End rebar 68 is bent into a rectangular U-shape. That is, it describes two right angles, first having a longer, central leg 70 approximating 24" to match deck 22's depth, and also having two side legs 72 which may conveniently be one foot, or so, in length, as shown in use on the left-hand end of deck 22 in FIGS. 4, 5 and 7. A leg 72 next to a wall may give additional strength to that corner of the underlayment. End rebar 68 may also be provided with a central leg 70 to match other deck depths.

A rebar having a single right angle 74 may also be provided, an example of same being shown in use on the right-hand end of deck 22. Right angle rebar 74 may conveniently be provided with each leg being 24" long, although rebar 74 can be trimmed as necessary to accommodate any right angle along a deck's outer or interior edges. Rebar 74 with longer legs may be provided, as well.

Other pre-formed rebar may also be provided, these, perhaps, being dimensioned for certain round, oval and square sinks as well as for various appliances such as "top-set" stoves.

In tying all rebar to deck 22, and in tying closely parallel rebar side-by-side, it has been found expedient to refrain from driving large staples 66 all the way into deck 22. Instead, sufficient room should be left for the rebar to float a bit and for the underlayment to seep beneath it. This is particularly important in places where the underlayment will lay over narrow surfaces, as between sink opening 24's front edge and deck 22's front edge where straight rebar 60 ties between flanges 64. There, a pair of large staples 66 are laid on their sides and wedged beneath straight rebar 60 to prop it up for placement near the mid-depth of the underlayment soon to be added. Any other handy, expendable item of similar size and rigidity may also serve this purpose well.

As an alternative to using large staples 66 to tie down rebar, one may simply employ sheets of lath 58 slightly larger than the area of the deck they are to cover, folding overhanging lath edges over the rebar and stapling it down with smaller staples 28. Thus, the rebar in this case is housed in a tube-like channel along the edge of deck 22.

Figure 6:
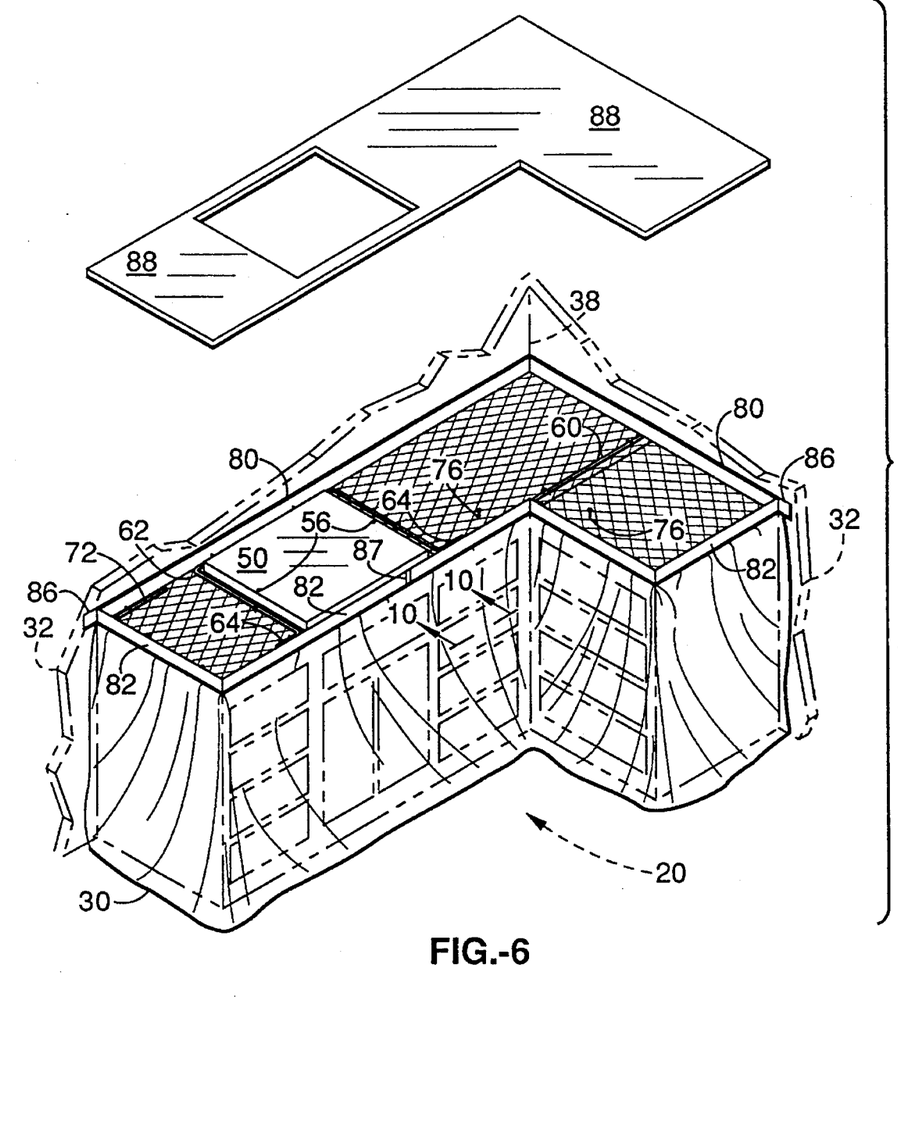
FIG. 6 is an exploded perspective view showing the elements of FIG. 5 in place atop the cabinet, and further showing a layer of underlayment thereover.
Figure 8:
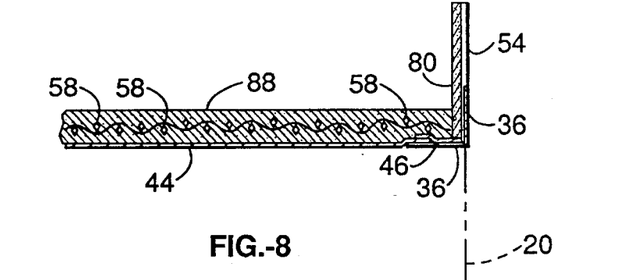
FIG. 8 is a sectional view along lines 8—8 of FIG. 7 showing roofing felt, moisture-impervious strips, tape and backer board containing the underlayment thereover, and further showing lath within the underlayment.

Sometimes it is important to be able to assure that an underlayment's surface in one area of a deck will be consistently level with that in another, somewhat remote, deck area. To assure this, one may drive a small nail 76 into deck 22 in each of the areas where a common level is desired, as shown in FIGS. 4, 6 and 8. Each nail 76 should be driven in so that its head sits at the approximate desired height of the underlayment's surface. Then, a spirit level 78, or the like, may be placed across them, as in FIG. 4, to permit adjustment of one or the other by tapping until their heads are at the same height, that height being the desired common level of the underlayment's surface. The foregoing procedure may be used, for example, over a countertop having an expansive area, on either side of an opening such as a sink, or between completely separate countertops. Thus, the areas for which a common level is sought may either be contiguous or separate.

To provide support for a tile backsplash extending a few inches up wall 32, cementitious backer board 80 approximately 4" in width is preferred. One length of board 80 should be cut for each wall 32, each length being as long as seam 34 between deck 22 and wall 32. One face of each length of backer board 80 is prepared with a bead of caulk 54 around its edges, and that face is pressed flush to wall 32 so that board 80's lower edge rests on the coverings of deck 22 previously discussed.

Backer board products expected to be satisfactory for use herein include the "Wonderboard" and "Durarock" brands of backer board, these being commonly known and available from building supply stores. The kit herein may include backer board in lengths of 5 ft., or so, these being in widths of 4–6" to accommodate different dimensions of backsplash tile.

Figure 10:
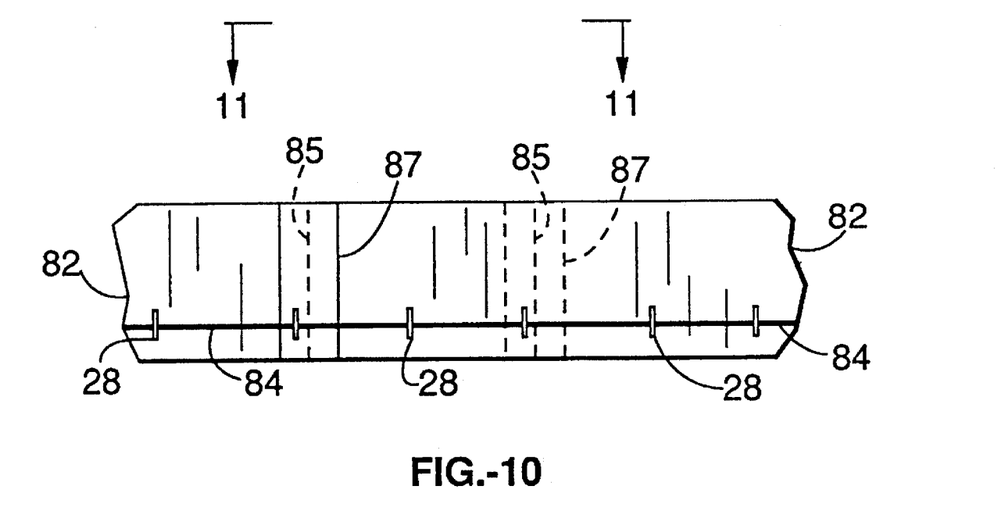
FIG. 10 is an enlarged, fragmentary elevational view taken on lines 10—10 of FIG. 6 showing overlapping dam ends and the placement of staples along a guide line.
Figure 11:
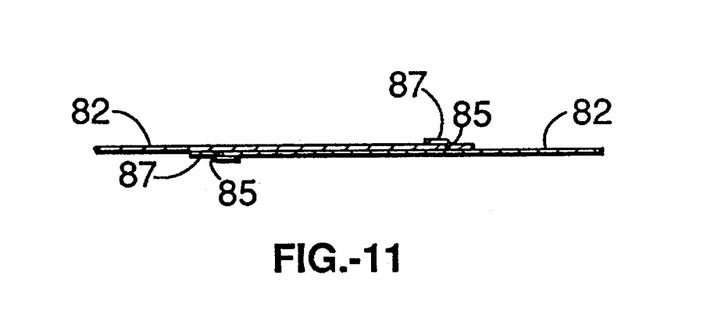
FIG. 11 is an enlarged, fragmentary top plan view taken on lines 11—11 of FIG. 10, showing placement of tape to seal seams of overlapping dam ends.

As the underlayment used has fluidity in its initial state, means must be provided to keep it from running off the front edges of deck 22. Thus, dams 82 are provided. Dams 82 are preferably 3"×48" lengths of ¼" corrugated cardboard coated with paraffin on at least one face. Either one or both faces of dam 82 may include a guide line 84, as shown in FIG. 10, approximately 1" in from the dam's edge for use in its proper orientation with respect to the edge of deck 22.

Figure 9:
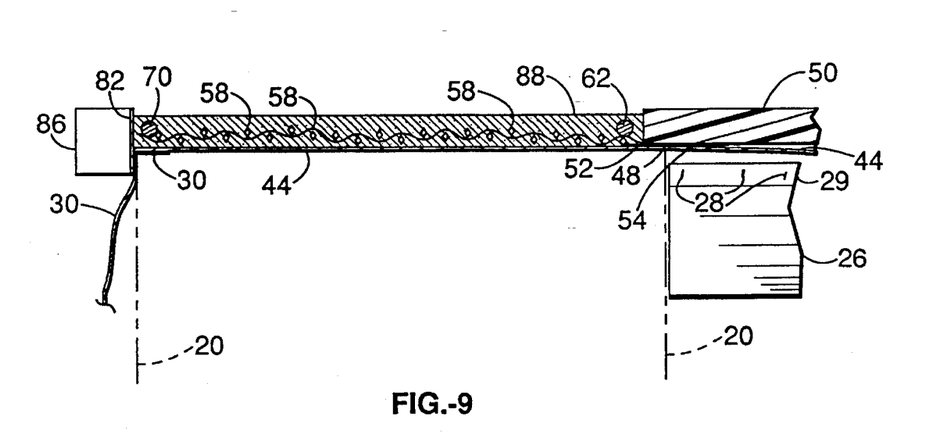
FIG. 9 is a sectional view along lines 9—9 of FIG. 7 showing a paper sling in a sink opening protecting the cabinet interior, an overlying sink punch-out, lath and rebar within the underlayment, and a dam and a shroud at the front of the cabinet.

As shown in FIGS. 5, 6 and 9, dams 82 are affixed along the front edge of deck 22. Best results are attained by first bending back a 1–2" end 86 of a dam and stapling it to a wall 32. From that point, the dam is simply stapled along the deck's front edge, following inside and outside corners, as necessary. Care must be taken to assure that the dam follows the deck's front edge at the proper height, so reference should be made to guide line 84 which, if set just below deck level, will cause dam 82 to project roughly 2", or so above the deck. Staples 28 are applied along, and perpendicular, to line 84.

Where necessary, dam ends 85 may be overlapped by 2–3" to permit coverage of deck fronts longer than 48". As shown in FIG. 10, this just requires a few extra staples 28 and a bit of tape 87 at each dam end to form a seam and to achieve a good seal.

It should be noted that nothing prevents dams 82 from being used around openings in the interior of deck 22. Indeed, in some cases, such use of dams 82 is required and punch-outs 50 are unnecessary. For example, if sink opening 24 is to accommodate a "self-rimming" sink it will be necessary to provide tile and underlayment right up to the edge of the opening. "Top-set" stoves require similar accommodation. In these cases, an upper rim of the sink or stove will overlap the tile surface after being dropped into the opening. Thus, the 1" border provided by punch-out 50, above, is not required. This approach requires felt 44 to be cut out around opening 24. And, extra care should be taken to protect the insides of cabinets 20 as by using plastic shrouds 30 in addition to paper sling 26.

At this point a mold has been defined to contain the underlayment while it sets. The preferred underlayment has a self-leveling capability and is a water-based slurry of cementitious composition. One underlayment product used with success herein is called "TSS Countertop Underlayment Powder" and is currently available from the Genesis Tile Corporation 8541 Younger Creek Drive, No. 10, Sacramento, Calif. 95828. It is also expected that various "portland" and "hydraulic" cement mixes may work satisfactorily here.

The entire amount of underlayment mix needed should be prepared all at once. As an example, approximately 4½ qts. of water are required per 50 lb. bag of dry TSS Countertop Underlayment Powder, and each 50 lb. bag so mixed will cover approximately 8 sq. ft. at ⅝" deep.

While pouring the mixed underlayment, reference should be made to the heads of nails 76 to achieve the proper depth. Best results are realized when the underlayment is caused to flow and settle evenly over the entire upper surface of deck 22. The self-leveling character of this fairly viscous slurry is promoted by tapping deck 22 from underneath and, perhaps, by opening and shutting the upper drawers in cabinets 20. This helps guard against air pockets beneath the surface and localized differences in the height of the underlayment.

Once mixed, poured and settled into the mold, the underlayment, as shown in FIGS. 6 through 9, and as identified with reference numeral 88, conforms to the shape of the upper surface of deck 22. Backer boards 80 and dams 82 define underlayment 88's perimeter, and its undersurface is contained by felt 44. As shown best in FIGS. 8 and 9, underlayment 88 seeps into lath 58, beneath rebar 60, 62 and 68, and remains contained by roofing felt 44.

The preferred underlayment mixes flow sufficiently to permit adjustment for 10 minutes, or so, before setting-up. However, it is best to permit the resulting underlayment to harden for approximately 24 hours before tiling its surface. It is also recommended that 24 hours be permitted to elapse before removing the dams and punch-out. Plastic shrouds 30 should also being removed at that time, these conveniently be trimmed from the edge of the underlayment 88 with a razor knife. And, felt 44 beneath sink punch-out 50 needs to be cut out along scored line 48, thereby defining the sink opening. Complete hardening, and maximum tensile strength of the preferred underlayment mixes is reached in roughly 26 days.

The foregoing detailed disclosure of the inventive method for forming an underlayment for a tile countertop, the underlayment so formed, and the kit for forming same, are considered as only illustrative of the preferred embodiments of, and not a limitation upon the scope of, the invention. Those skilled in the art will envision many other possible variations of the structure disclosed herein that nevertheless fall within the scope of the following claims. And, alternative uses for the inventive methods and combinations may later be realized. Accordingly, the scope of the invention should be determined with reference to the appended claims, and not by the examples which have herein been given.

What is claimed is:

1. A tile countertop underlayment comprising:

a. a horizontal top deck of a cabinet;

b. a sheet of lath;

c. means for affixing said lath to said deck;

d. a hardened, self-leveling, settable fluid matrix covering said lath and having an upper surface sufficiently level and even for tiling; and,    e. a first nail driven part-way into said deck in a first area of said deck, said first nail's head residing in the same horizontal plane as said underlayment's upper surface in said first area, said first nail's head also residing in the same horizontal plane as the head of a second nail, said second nail being driven part-way into said deck in a second area of said deck and residing in the same horizontal plane as said underlayment's upper surface in said second area of said deck.

2. The underlayment of claim 1, further including sheathing bound between said deck and said underlayment's undersurface.

3. The underlayment of claim 1, further including at least one rigid, elongate, edge reinforcement member set within said matrix closely adjacent and parallel to an edge of said deck.

4. The underlayment of claim 3, wherein said at least one edge reinforcement member is bent to follow an angle between two adjacent edges of said deck.

5. A tile countertop underlayment comprising:

a. horizontal top deck of a cabinet;
   b. a sheet of lath;
   c. means for affixing said lath to said deck;
   d. a hardened, self-leveling, settable fluid matrix covering said lath and having an upper surface sufficiently level and even for tiling; and,
   e. at least one rigid, elongate, edge reinforcement member connected to said lath and set within said matrix closely adjacent and parallel to an edge of said deck.

6. The underlayment of claim 5, further including sheathing bound between said deck and said underlayment's undersurface.

7. The underlayment of claim 5, wherein said rigid, elongate, edge reinforcement member is bent to follow an angle between two adjacent edges of said deck.

* * * * *